(12) United States Patent
Shah et al.

(10) Patent No.: US 11,466,204 B2
(45) Date of Patent: Oct. 11, 2022

(54) LUTETIUM OXIDE-BASED SCINTILLATOR MATERIALS INCLUDING RELATED SYSTEMS AND METHODS

(71) Applicant: Radiation Monitoring Devices, Inc., Watertown, MA (US)

(72) Inventors: Kanai S. Shah, Watertown, MA (US); Jaroslaw Glodo, Allston, MA (US); Charles Brecher, Lexington, MA (US); Yimin Wang, Newton, MA (US); William Rhodes, Lexington, MA (US); Urmila Shirwadkar, Burlington, MA (US); Edgar V. Van Loef, Watertown, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 16/866,441

(22) Filed: May 4, 2020

(65) Prior Publication Data

US 2021/0087465 A1    Mar. 25, 2021

Related U.S. Application Data

(63) Continuation of application No. 15/601,915, filed on May 22, 2017, now Pat. No. 10,640,705.

(60) Provisional application No. 62/425,824, filed on Nov. 23, 2016, provisional application No. 62/339,631, filed on May 20, 2016.

(51) Int. Cl.
*G01T 1/202*   (2006.01)
*G01T 1/20*    (2006.01)
*C09K 11/77*   (2006.01)
*C01F 17/206*  (2020.01)

(52) U.S. Cl.
CPC ........ *C09K 11/7769* (2013.01); *C01F 17/206* (2020.01); *G01T 1/2018* (2013.01); *G01T 1/2023* (2013.01)

(58) Field of Classification Search
CPC . C09K 11/7769; C01F 17/206; G01T 1/2023; G01T 1/2018; G21K 4/00
See application file for complete search history.

(56) References Cited

U.S. PATENT DOCUMENTS

2014/0291580 A1* 10/2014 Zagumennyi ............ G21K 4/00
                                                           252/301.4 F

OTHER PUBLICATIONS

Guznik et al, Structural Investigations of Lu2O3 as Single Crystal and Polycrystalline Transparent Ceramic, 2014, Cryst. Growth Des, vol. 14, pp. 3327-3334 (Year: 2014).*
Zych et al., Radioluminescence of Lu2O3:Eu nanocrystalline powder and vacuum-sintered ceramic, 2004, Radiation Measurements, vol. 38, pp. 471-474. (Year: 2004).*
Kopylov et al., Fabrication and characterization of Eu3+-doped Lu2O3 scintillation ceramics, Feb. 2013, Optical Materials, vol. 35, pp. 812-816. (Year: 2013).*

* cited by examiner

*Primary Examiner* — Christine S. Kim
(74) *Attorney, Agent, or Firm* — Wolf, Greenfield & Sacks, P.C.

(57) ABSTRACT

Lutetium oxide-based scintillator materials, as well as corresponding methods and systems, are described.

6 Claims, 15 Drawing Sheets

| Material | Density g/cm³ | Luminosity ph/MeV | Emission nm | Principal Decay |
|---|---|---|---|---|
| CdWO₄ | 7.9 | 15,000 | 480 | 14 μs |
| Lu₂O₃ (Pure) | 9.4 | >30,000 *) | 410 | 30 ns |

*) Powder based estimates

FIG. 5

LUTETIUM OXIDE-BASED SCINTILLATOR MATERIALS INCLUDING RELATED SYSTEMS AND METHODS

RELATED APPLICATIONS

This application is a continuation of U.S. application Ser. No. 15/601,915, filed May 22, 2017, which claims priority to U.S. Provisional Application No. 62/339,631 filed May 20, 2016 and U.S. Provisional Application No. 62/425,824, filed Nov. 23, 2016, which are incorporated herein by reference in their entirety.

FIELD OF INVENTION

The invention relates generally to scintillator technology and corresponding systems and methods.

BACKGROUND

Scintillators are widely used detectors for spectroscopy of energetic photons. These detectors are commonly used in nuclear and high energy physics research, medical imaging, diffraction, non-destructive testing, nuclear treaty verification and safeguards, and geological exploration. Important properties for the scintillation crystals used in these applications include high light output, fast response, low cost, good proportionality and minimal afterglow. There is continued interest in the search for scintillator materials that have one or more of these properties.

BRIEF DESCRIPTION OF DRAWINGS

FIG. 5 shows a table with a $Lu_2O_3$ (undoped) sample as compared to $CdWO_4$ compositions.

DETAILED DESCRIPTION

Figure 1:
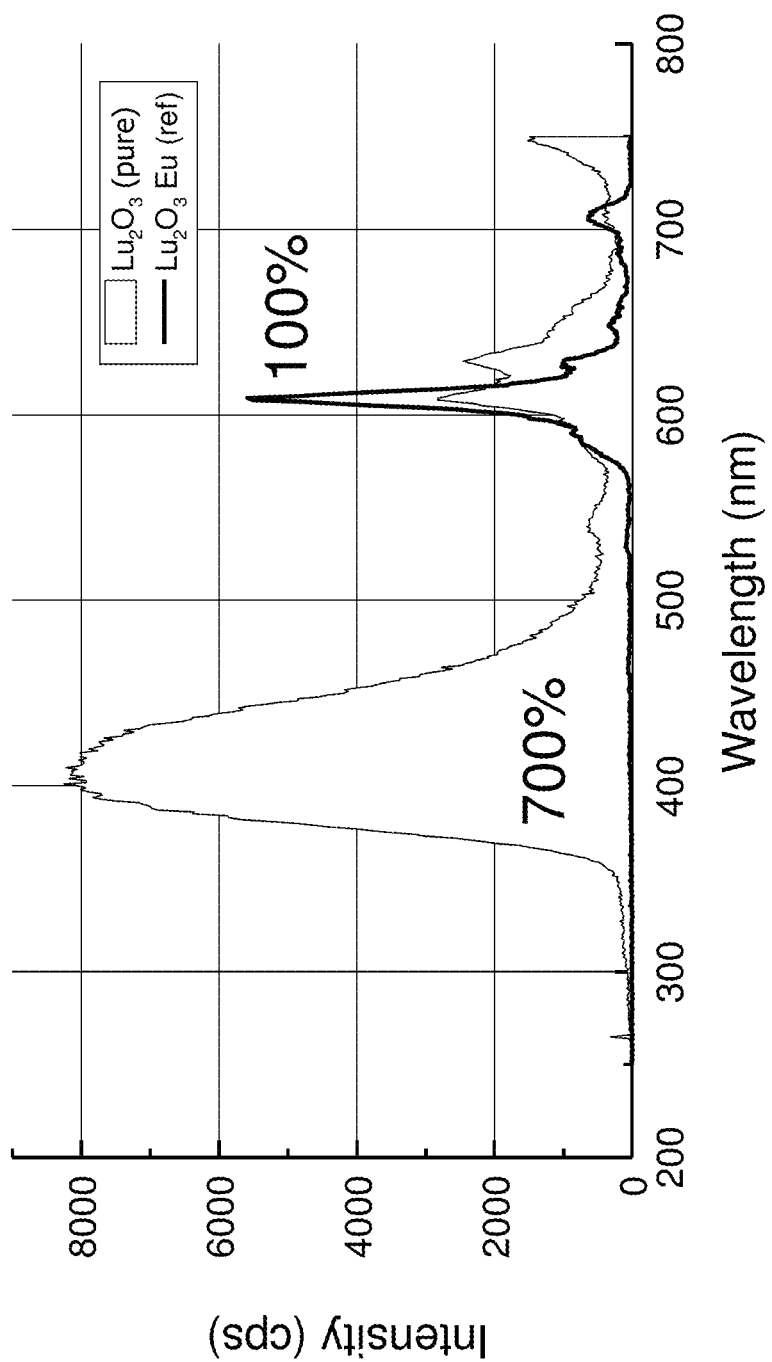
FIG. 1 shows an emission spectrum of a $Lu_2O_3$ (undoped) scintillator material powder sample as compared to a reference sample of a $Lu_2O_3$ (Eu) scintillator material powder sample.

Scintillator materials, as well as corresponding methods and systems, are described. The scintillator material can be a lutetium oxide-based scintillator materials including undoped lutetium oxide-based scintillator materials.

In some embodiments, the scintillator material composition may have the representative formula $(Lu_xRE_y)_2O_3$, where $x+y=1$ and RE may be selected from the group consisting of $La^{3+}$, $Y^{3+}$, $Sc^{3+}$, $Pr^{3+}$, $Nd^{3+}$, $Sm^{3+}$, $Dy^{3+}$, $Ho^{3+}$, $Er^{3+}$, $Tm^{3+}$, $Gd^{3+}$, $Tb^{3+}$, $Yb^{3+}$, $Ce^{3+}$, $Bi^{3+}$, $In^{3+}$, $Ga^{3+}$, $Al^{3+}$, $B^{3+}$ including any combination of these ions. In some embodiments, the scintillator material composition is undoped (i.e., pure) $Lu_2O_3$. In some embodiments, the scintillator composition may have the representative formula $(Lu_xLa_y)_2O_3$, where $x+y=1$. In some embodiments, the scintillator composition may have the representative formula $(Lu_xYb_y)_2O_3$, where $x+y=1$. In some embodiments, the scintillator composition may have the representative formula $(Lu_xLa_yYb_z)_2O_3$, where $x+y+z=1$.

In some embodiments, the compositions are undoped. In other embodiments, the compositions may be doped. Such materials have been shown to have particularly attractive scintillation properties (e.g., bright and fast light emission) and may be used in a variety of applications for radiation detection as described further below.

The scintillator material compositions may be prepared in several different forms. In some embodiments, the composition may be in powder form. The composition may be in nano-particulate form. In some embodiments, the composition may be in bulk form. The composition may be in the form of a film (e.g., thin and thick films). The composition may be in a crystalline form. For example, the scintillator compositions may be in the form of a single crystal (i.e., monocrystalline) or polycrystal. The composition may be have an amorphous structure. The scintillator, for example, may be in the form of a dense, transparent body (e.g., dense polycrystalline transparent body, dense single crystal transparent body).

The scintillator compositions can exhibit excellent scintillation properties including bright and fast emission. Without being bound by any theory, the emission may be a defect type emission (e.g., defect type emission in undoped $Lu_2O_3$). It is believed that the defect type emission may be created by identifying processing conditions (e.g., processing material in a reducing atmosphere).

As noted above, such materials have been shown to have particularly attractive scintillation properties (e.g., bright and fast light emission). In some embodiments, the scintillator composition (in either powder or crystal form) may have a scintillation time constant of less than 5 ns; in some embodiments; less than 10 ns; in some embodiments, less than 20 ns; in some embodiments, less than 30 ns; in some embodiments, less 40 ns; and, in some embodiments, less than 50 ns; and, in some embodiments, less than 100 ns. In some embodiments, the scintillation composition has a light yield of greater than 5000 photons/MeV; in some embodiments, greater than 10,000 photons; in some embodiments, greater than 15,000 photons; and, in some embodiments, greater than 0.25,000 photons/MeV; and, in some embodiments, greater than 30,000 photons/MeV.

As noted above, the scintillator compositions described herein can be used in detectors. The detector may include a scintillator optically coupled to a light photodetector or imaging device. The detector assembly can include a data analysis system to process information from the scintillator and light photodetector. In use, the detector detects energetic radiation emitted from a source.

A data analysis, or computer, system thereof can include, for example, a module or system to process information (e.g., radiation detection information) from the detector/photodetectors can also be included in an invention assembly and can include, for example, a wide variety of proprietary or commercially available computers, electronics, or systems having one or more processing structures, a personal computer, mainframe, or the like, with such systems often having data processing hardware and/or software configured to implement any one (or combination of) the method steps described herein. Any software will typically include machine readable code of programming instructions embodied in a tangible media such as a memory, a digital or optical recording media, optical, electrical, or wireless telemetry signal recording media, or the like, and one or more of these structures may also be used to transmit data and information between components of the system in any of a wide variety of distributed or centralized signal processing architectures.

The detector assembly typically includes material formed from the scintillator composition described herein. The detector further can include, for example, a light detection assembly including one or more photodetectors. Non-limiting examples of photodetectors include photomultiplier tubes (PMT), photodiodes (e.g., silicon photodiodes including p-i-n diodes, APDs and SiPMs), CCD sensors, image intensifiers, and the like. Choice of a particular photodetector will depend in part on the type of radiation detector being fabricated and on its intended use of the device. In certain embodiments, the photodetector may be position-sensitive.

The detector assemblies themselves, which can include the scintillator and the photodetector assembly, can be used in a variety of applications and, accordingly, connected to a variety of tools and devices. Non-limiting examples include X-ray radiography, MeV scale x-ray/gamma-ray radiography, photon counting, well-logging tools, and imaging devices, such as nuclear medicine devices (e.g., PET). Various technologies for operably coupling or integrating a radiation detector assembly containing a scintillator to a detection device can be utilized in the present invention, including various known techniques.

The detectors may also be connected to a visualization interface, imaging equipment, or digital imaging equipment (e.g., pixilated flat panel devices). In some embodiments, the scintillator may serve as a component of a screen scintillator. For example, powdered scintillator material could be formed into a relatively flat plate, which is attached to a film, such as photographic film. Energetic radiation, e.g., X-rays, gamma-rays, neutron, originating from a source, would interact with the scintillator and be converted into light photons, which are visualized in the developed film. The film can be replaced by amorphous silicon position-sensitive photodetectors or other position-sensitive detectors, such as avalanche diodes and the like.

Imaging devices, including medical imaging equipment, such as the PET (including whole body and dedicated organ imaging) and SPECT devices, and the like, represent another important application for invention scintillator compositions and radiation detectors. In PET applications, a radiopharmaceutical or detectable label is administered to a patient and may become concentrated within a specific tissue or organ. Radionuclides from the compound decay and emit positrons. When the positrons encounter electrons, they are annihilated and converted into photons, or gamma-rays. The PET scanner can locate these "annihilations" and thereby reconstruct an image of the tissue/organ for observation. The detector modules in the scanner usually include a number of "cameras" or "detectors," along with the associated circuitry, for detecting annihilation events and reconstructing an image of the patient's tissue or organ.

Example 1

A $Lu_2O_3$ (undoped) scintillator material powder sample was produced. Various scintillator properties were measured.

Figure 2:
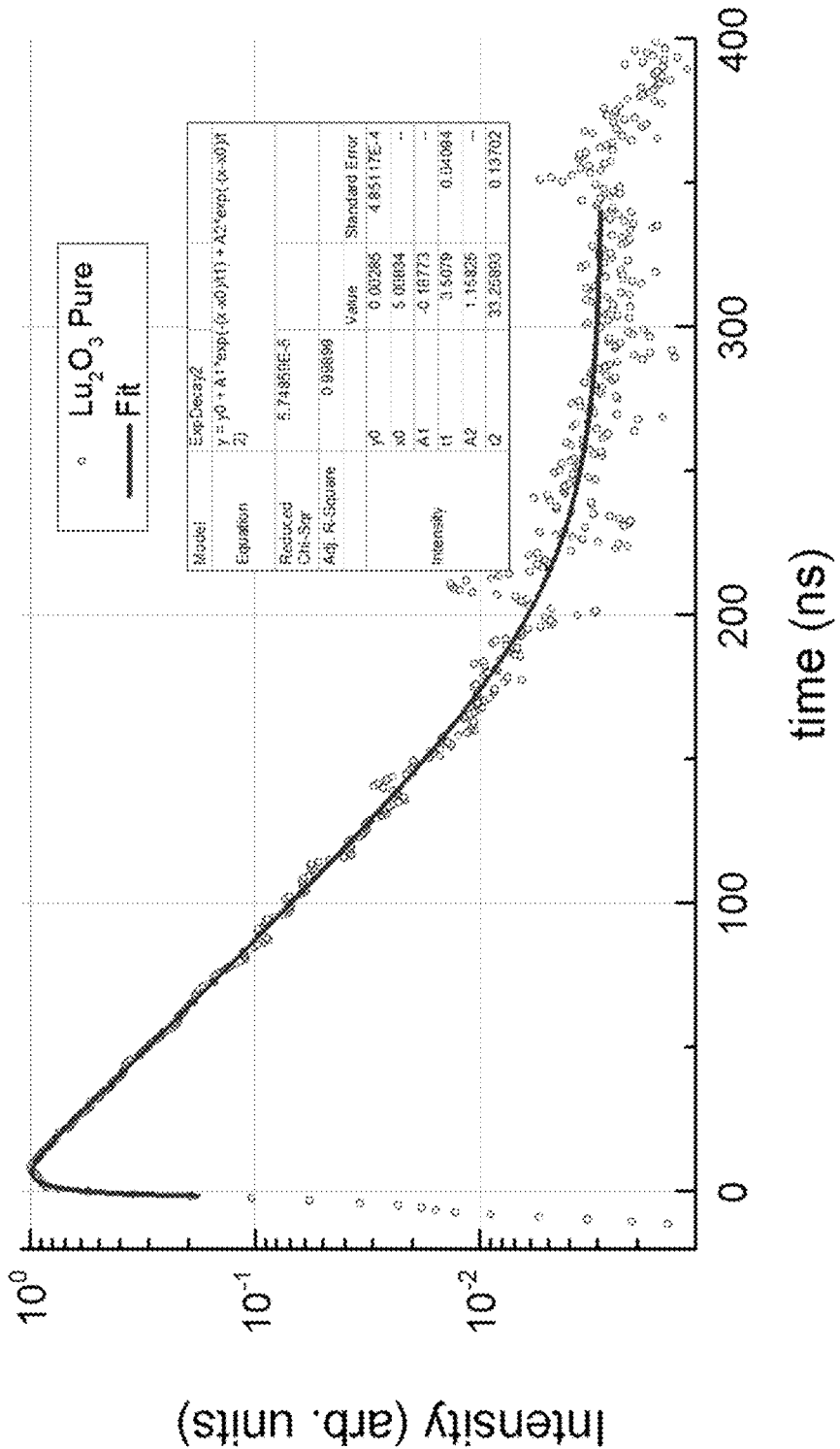
FIG. 2 shows decay time and timing resolution of a $Lu_2O_3$ (undoped) scintillator material powder sample.
Figure 3:
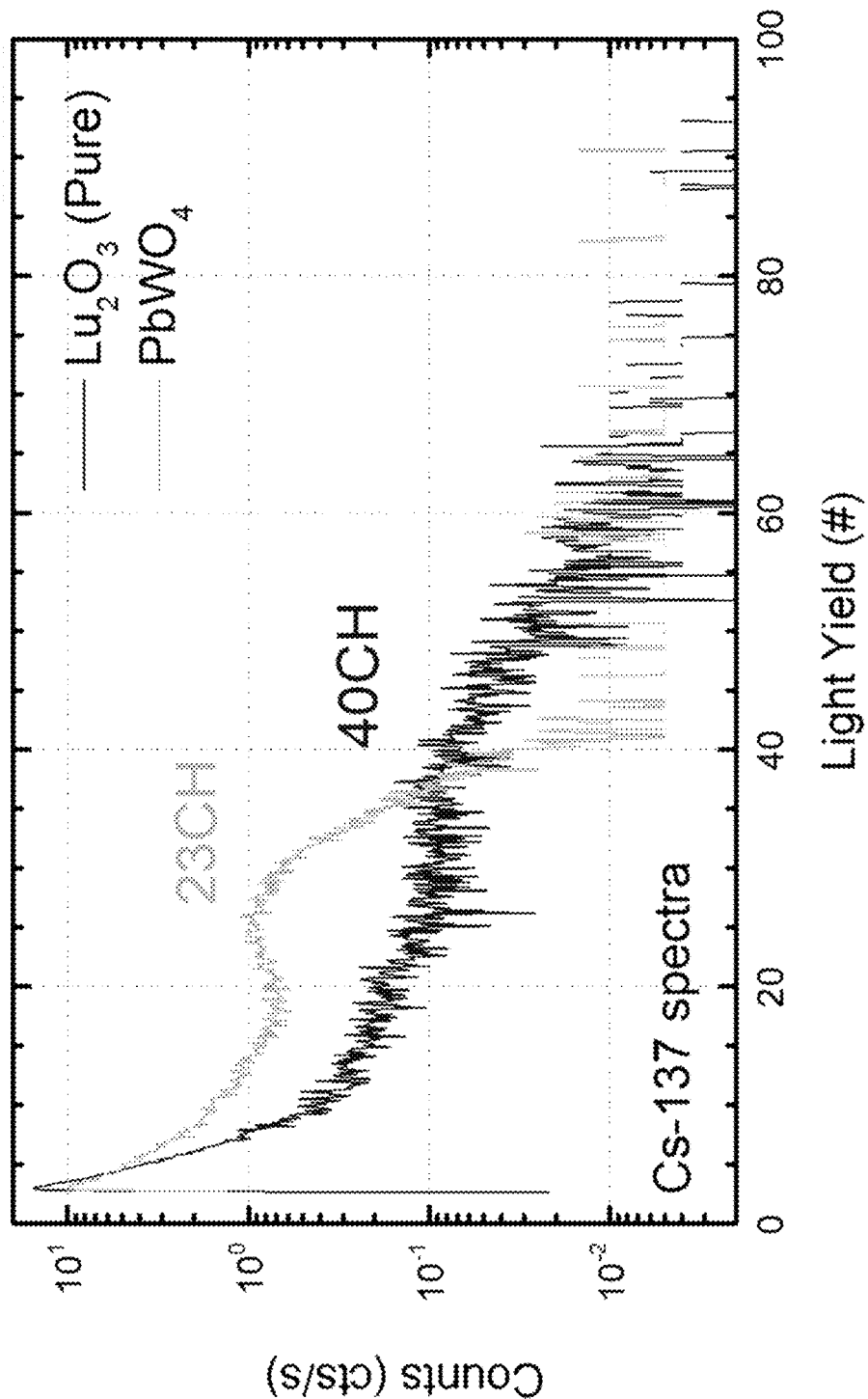
FIG. 3 shows the light yield of a $Lu_2O_3$ (undoped) scintillator material powder sample.
Figure 4:
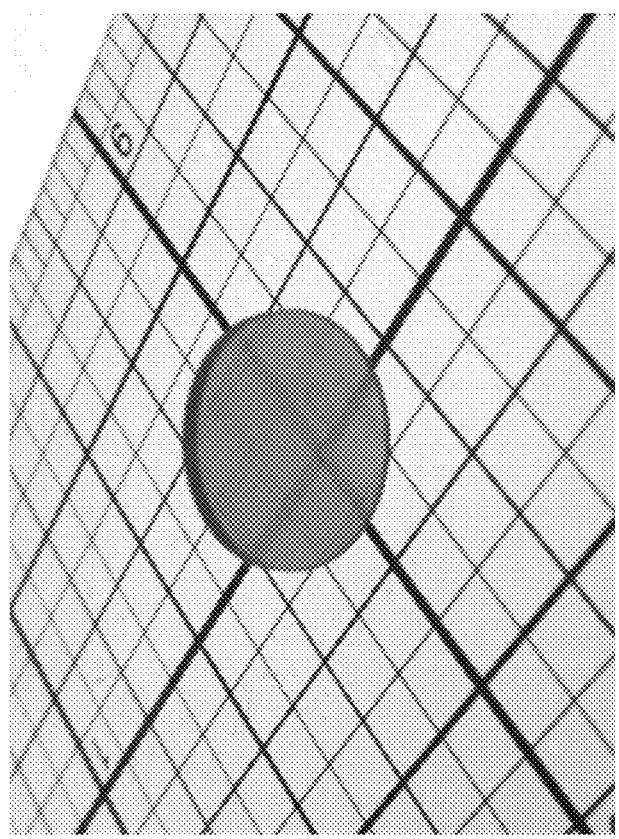
FIG. 4 shows a photograph of a $Lu_2O_3$ (undoped) scintillator material crystal sample.

FIG. 1 shows an emission spectrum of the $Lu_2O_3$ (undoped) scintillator material powder sample as compared to a reference sample of a $Lu_2O_3$ (Eu) scintillator material powder sample. FIG. 2 shows decay time and timing resolution of the $Lu_2O_3$ (undoped) scintillator material powder sample. FIG. 3 shows the light yield of the $Lu_2O_3$ (undoped) scintillator material powder sample. FIG. 4 shows a photograph of a $Lu_2O_3$ (undoped) scintillator material crystal sample. FIG. 5 shows a table with a $Lu_2O_3$ (undoped) sample as compared to $CdWO_4$ compositions.

Example 2

Figure 6:
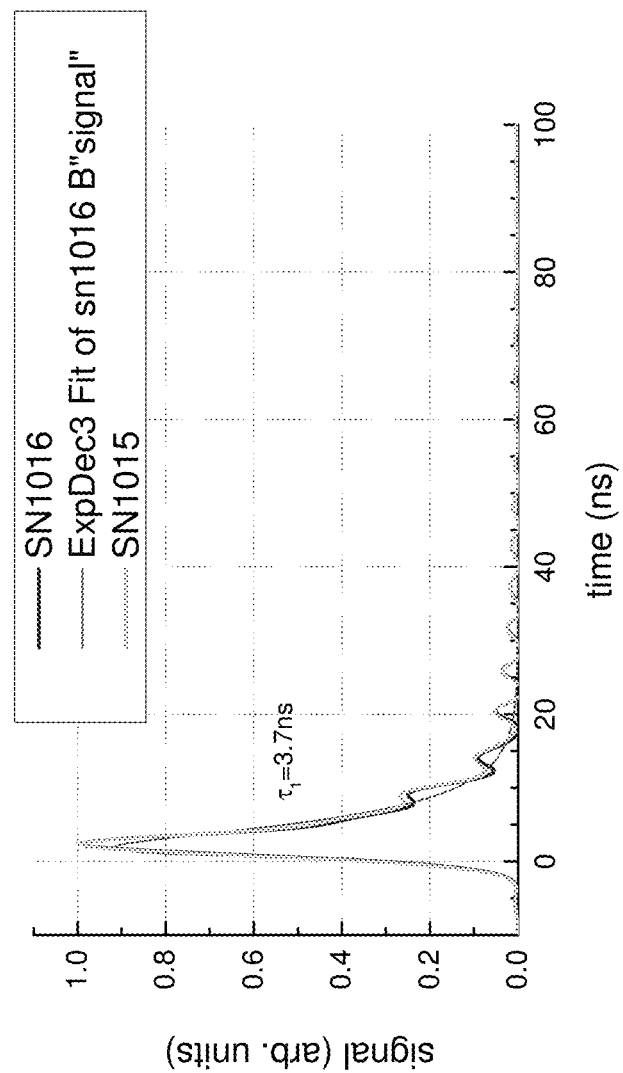
FIG. 6 shows decay time and timing resolution of a $Lu_2O_3$ (undoped) ceramic sample.

An undoped $Lu_2O_3$ (undoped) scintillator material ceramic sample was produced. Various scintillator properties were measured. FIG. 6 shows decay time and timing resolution of the $Lu_2O_3$ (undoped) ceramic sample.

Example 3

Figures 7, 8, 9:
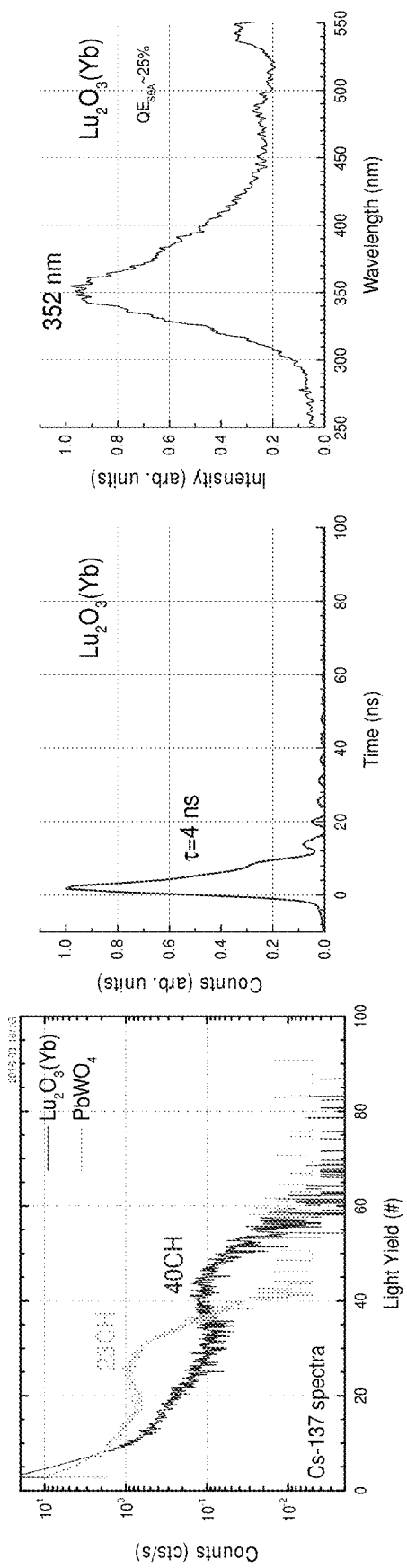
FIG. 7 shows the light yield of a $Lu_2O_3$:Yb doped sample as compared to a $PbWO_4$ sample.
FIG. 8 shows the decay time of a $Lu_2O_3$:Yb doped sample.
FIG. 9 shows the emission spectrum of a $Lu_2O_3$:Yb doped sample.

A $Lu_2O_3$:Yb doped scintillator material sample was produced. Various scintillator properties were measured. FIG. 7 shows the light yield of the $Lu_2O_3$:Yb doped sample as compared to a $PbWO_4$ sample. FIG. 8 shows the decay time of the $Lu_2O_3$:Yb doped sample. FIG. 9 shows the emission spectrum of the $Lu_2O_3$:Yb doped sample.

Example 4

Figure 10A:
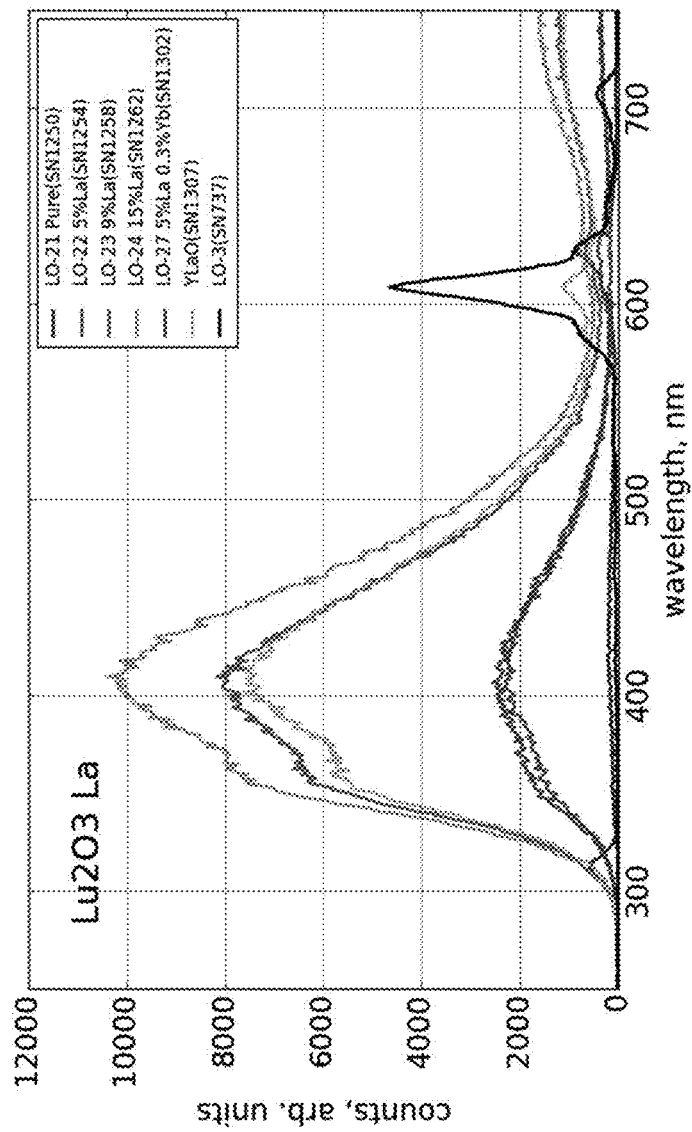
FIGS. 10A and 10B show the emission spectrum of a $Lu_2O_3$:La sample.
Figure 10B:
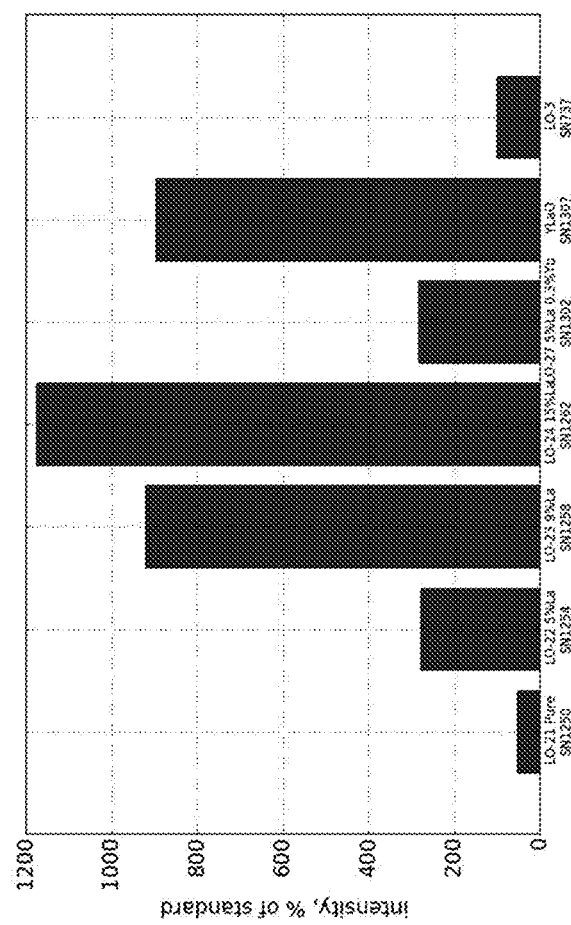
Figure 11:
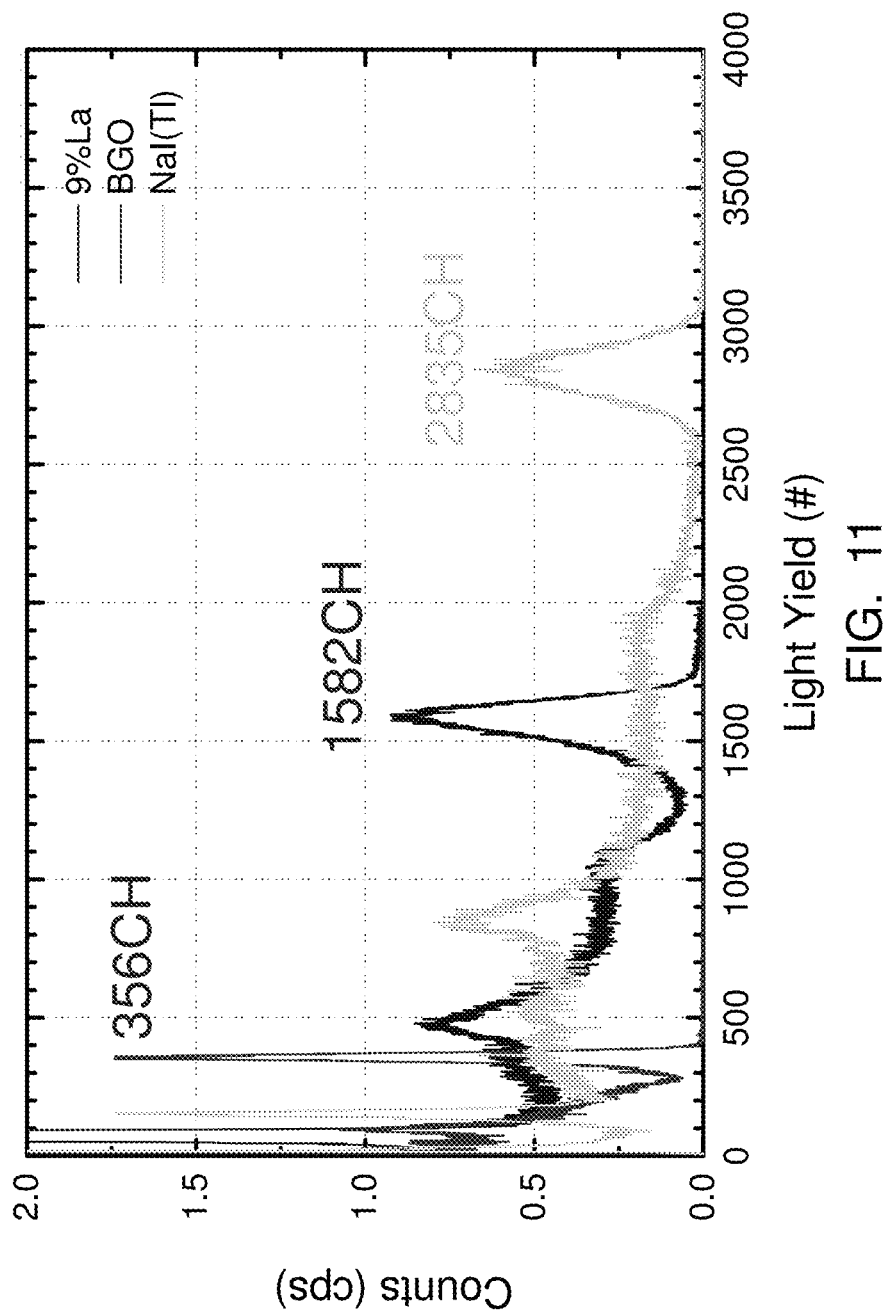
FIG. 11 shows the light yield of a $Lu_2O_3$:La (with 9% La) sample as compared to BGO and NaI(Tl) samples.
Figure 12A:
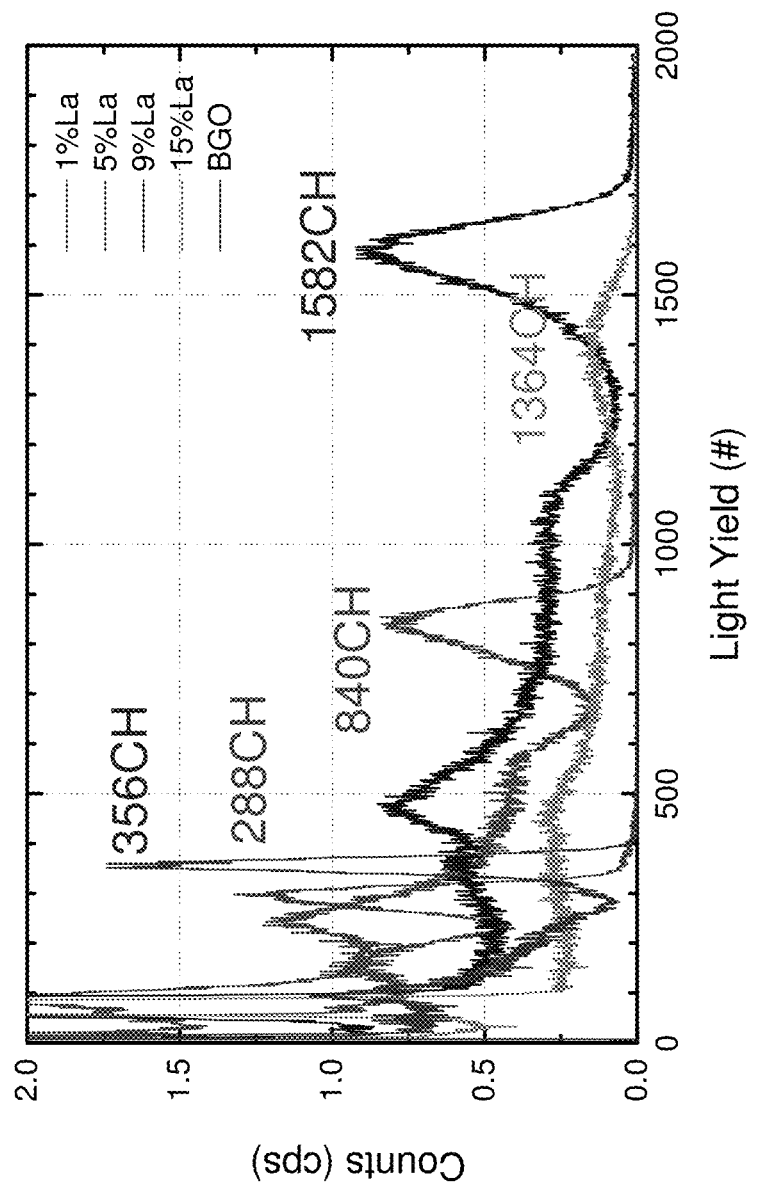
FIGS. 12A and 12B shows the light yield of $Lu_2O_3$:La samples at different La concentrations (1%, 5%, 9%, 15%).
Figure 12B:
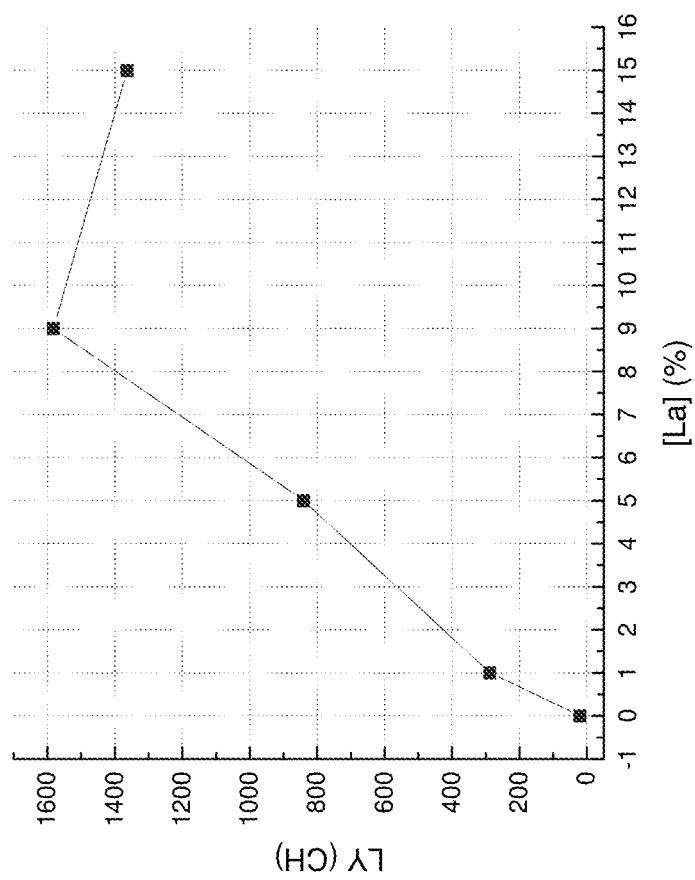
Figure 13:
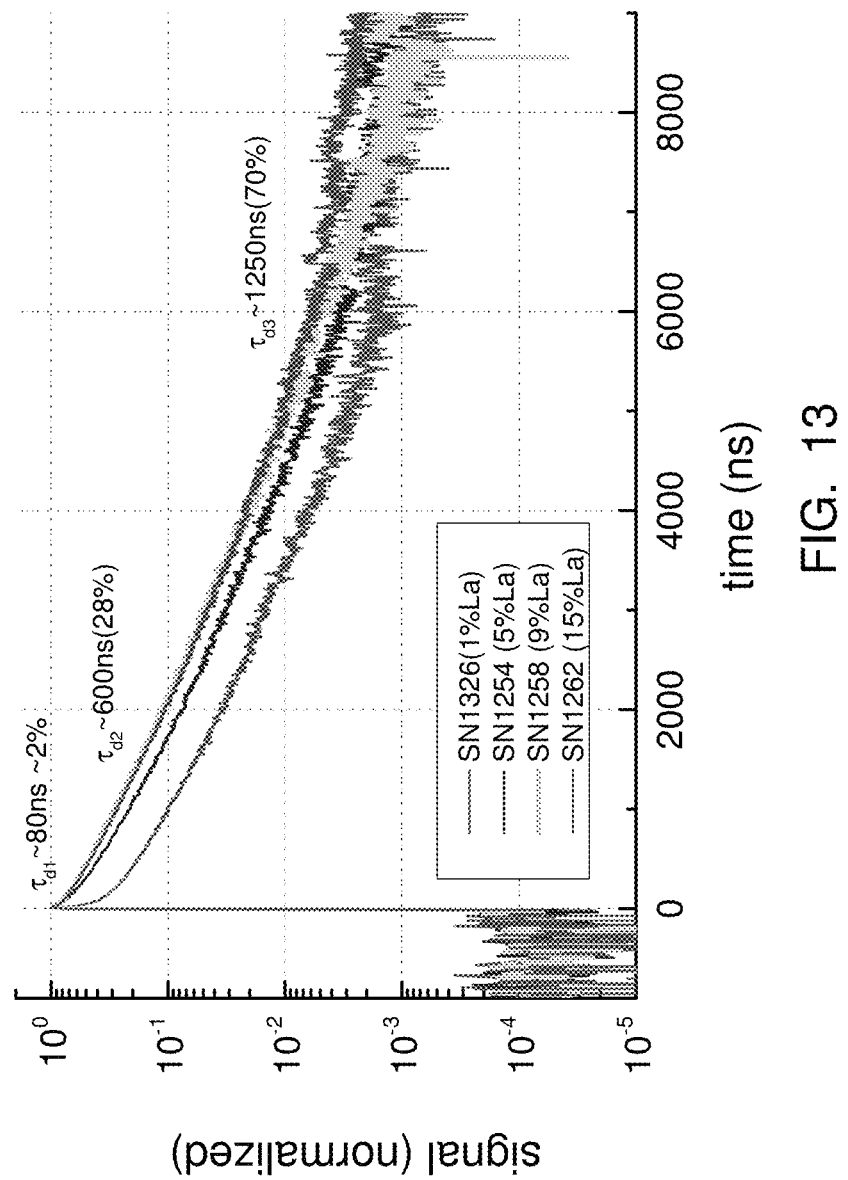
FIG. 13 shows the decay time of $Lu_2O_3$:La samples at different La concentrations.
Figure 14:
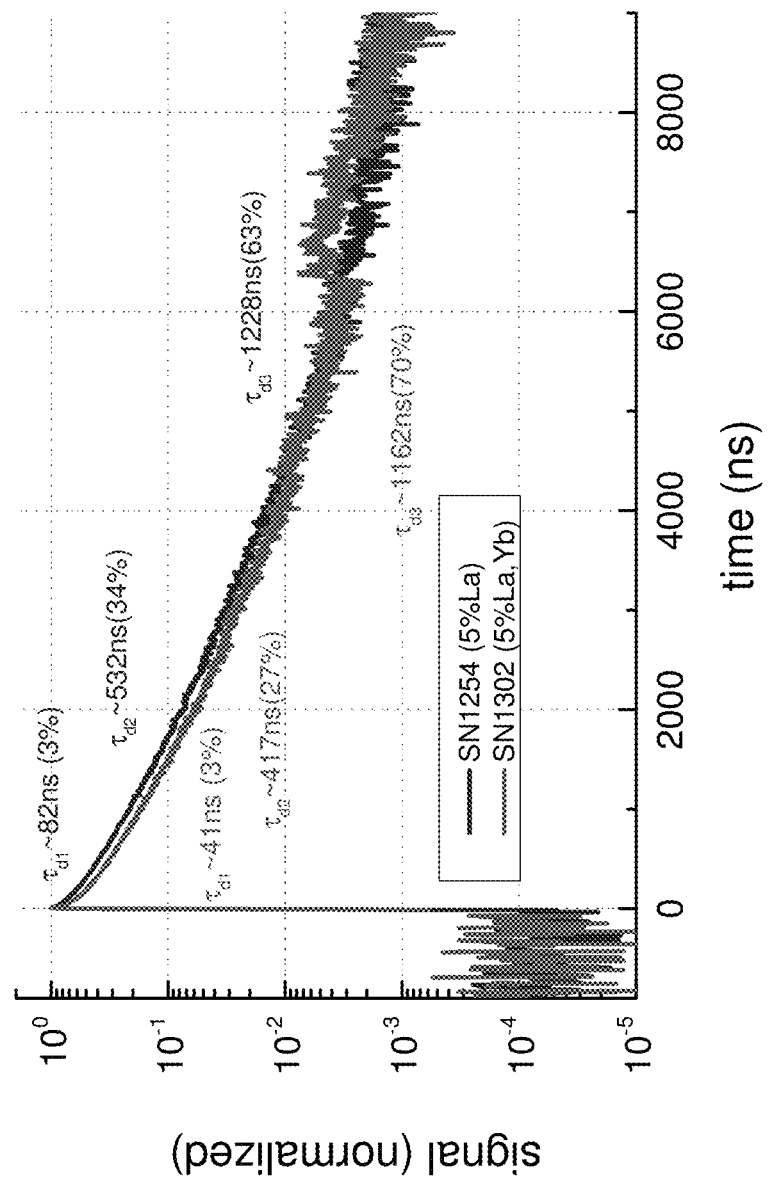
FIG. 14 shows the decay time of a $Lu_2O_3$:La (5% La) sample compared to the decay time of a $Lu_2O_3$:La, Yb (5% La) sample.
Figure 15:
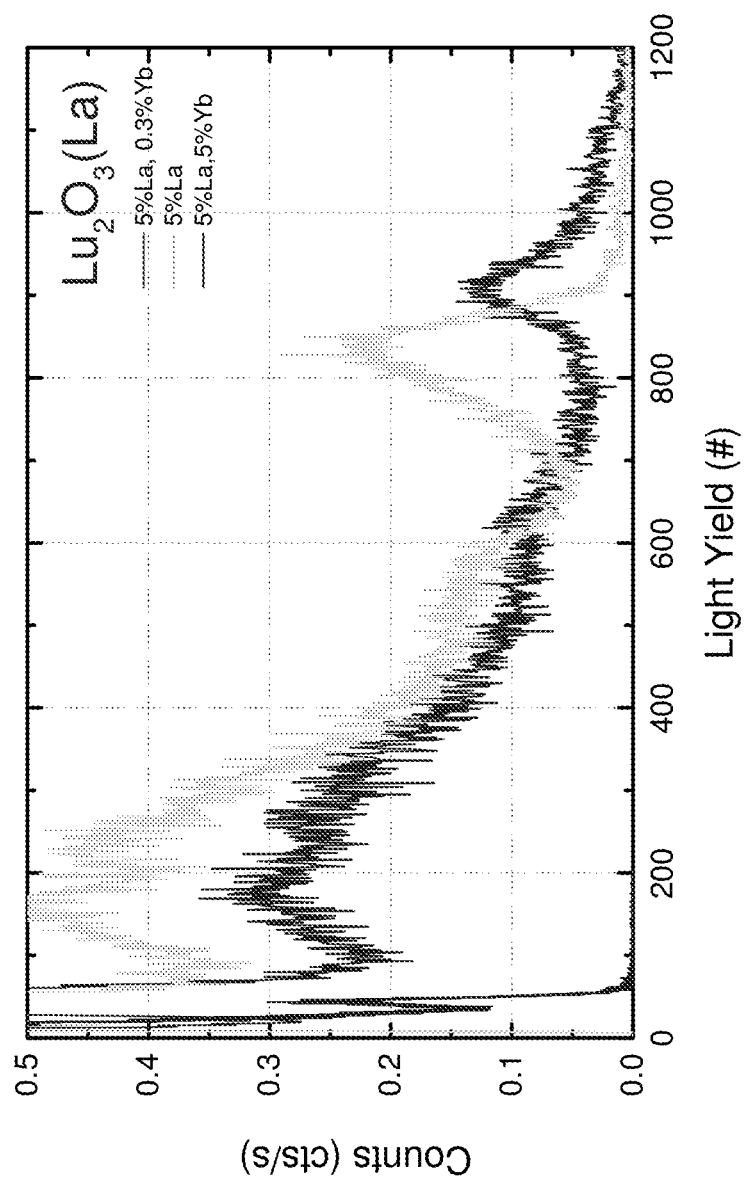
FIG. 15 shows the light yield of a $Lu_2O_3$:La (5% La) sample compared to the light yield of $Lu_2O_3$:La, Yb (5% La, 0.3% Yb; 5% La, 5% Yb) samples.

$Lu_2O_3$:La scintillator material samples were produced. Various scintillator properties were measured. FIGS. 10A and 10B show the emission spectrum of a $Lu_2O_3$:La sample. FIG. 11 shows the light yield of a $Lu_2O_3$:La (with 9% La) sample as compared to BGO and NaI(Tl) samples. FIGS. 12A and 12B shows the light yield of $Lu_2O_3$:La samples at different La concentrations (1%, 5%, 9%, 15%). FIG. 13 shows the decay time of $Lu_2O_3$:La samples at different La concentrations. FIG. 14 shows the decay time of a $Lu_2O_3$:La (5% La) sample compared to the decay time of a $Lu_2O_3$:La, Yb (5% La) sample. FIG. 15 shows the light yield of a $Lu_2O_3$:La (5% La) sample compared to the light yield of $Lu_2O_3$:La, Yb (5% La, 0.3% Yb; 5% La, 5% Yb) samples.

The invention claimed is:

1. A scintillator composition having the representative formula $Lu_2O_3$:La, wherein the La concentration is between 1% and 15%, wherein the scintillator composition has a scintillation time constant of less than 100 ns.

2. The scintillator composition of claim 1, wherein the scintillator is crystalline.

3. The scintillator composition of claim 1, wherein the scintillator is polycrystalline.

4. A detection system comprising:
   a scintillator comprising the scintillator composition of claim 1; and a detector assembly coupled to the scintillator to detect a light pulse luminescence from the scintillator as a measure of a scintillation event.

5. The detection system of claim 4, wherein the system is a PET system.

6. A detection method comprising:

providing a detection system comprising a scintillator composition of claim 1, the system further comprises a detection assembly coupled to the scintillator composition to detect a light pulse luminescence from the scintillator composition as a measure of a scintillation event; and positioning the system such that a radiation source is within a field of view of the system so as to detect emissions from the source; and, measuring a scintillation event luminescence signal from the scintillator composition with the detection assembly.

* * * * *